(12) United States Patent
Watanabe et al.

(10) Patent No.: US 6,731,602 B1
(45) Date of Patent: May 4, 2004

(54) PACKET COMMUNICATION SYSTEM AND PACKET COMMUNICATION APPARATUS

(75) Inventors: Koji Watanabe, Kokubunji (JP); Tomoaki Ishifuji, Suginami-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/246,808

(22) Filed: Feb. 9, 1999

(30) Foreign Application Priority Data

Feb. 20, 1998  (JP) ............................................ 10-056017

(51) Int. Cl.[7] .............................. H04L 12/56; H04J 3/24; H04B 7/00
(52) U.S. Cl. .................... 370/231; 370/310.2; 370/338; 370/349; 370/395.43; 370/473; 370/477
(58) Field of Search ................................ 370/229, 231, 370/232, 235, 236, 276, 277, 280, 282, 294, 310, 328, 329, 336, 337, 338, 341, 345, 347, 349, 357, 359, 360, 389, 392, 394, 395.1, 395.21, 395.4, 395.43, 395.7, 395.71, 412, 419, 428, 429, 442, 443, 310.01, 310.02, 473, 477, 516

(56) References Cited

U.S. PATENT DOCUMENTS

| | | | | |
|---|---|---|---|---|
| 5,384,770 A | * | 1/1995 | Mays et al. .................. | 370/300 |
| 5,402,417 A | * | 3/1995 | Aramaki ...................... | 370/392 |
| 5,638,371 A | * | 6/1997 | Raychaudhuri et al. .. | 370/310.2 |
| 5,684,791 A | * | 11/1997 | Raychaudhuri et al. ..... | 370/280 |
| 5,694,397 A | * | 12/1997 | Burton ........................ | 370/516 |
| 5,717,689 A | * | 2/1998 | Ayanoglu .................... | 370/349 |
| 6,058,114 A | * | 5/2000 | Sethuram et al. ............ | 370/231 |
| 6,128,287 A | * | 10/2000 | Freeburg et al. ............ | 370/331 |
| 6,141,336 A | * | 10/2000 | Bauchot et al. ............. | 370/348 |
| 6,151,312 A | * | 11/2000 | Evans et al. ................. | 370/337 |
| 6,157,614 A | * | 12/2000 | Pasternak et al. ........... | 370/236 |
| 6,175,871 B1 | * | 1/2001 | Schuster et al. ............. | 709/231 |
| 6,188,697 B1 | * | 2/2001 | Umehira et al. ........ | 370/395.21 |
| 6,282,187 B1 | * | 8/2001 | Evans et al. ................. | 370/347 |

OTHER PUBLICATIONS

Umehira et al, ATM Wireless Access for Mobile Multimedia: Concept and Architecture, Oct. 1996, IEEE personal Communications, pp. 39–48.*
Sato et al, A Novel Buffer Control Scheme for ATM Cell Transport with Improved Cell Delay Variation for Wireless ATM, 1996, IEEE, pp. 929–932, vol. 3.*
"Performance of Dynamic Rate Leaky Bucket Algorithm" Electronic Letters, 19th Aug. 1993, vol. 29, No. 17, pp. 1560–1561 (cited the specification).
"A Cell Stream Multiplex Scheme using Time–Stamp for Wireless ATM" Technical Report of ICICE, IN97–27, CS97–8, MVE97–7(1997–04) (cited in the specification).

* cited by examiner

Primary Examiner—Hassan Kizou
Assistant Examiner—Ahmed Elallam
(74) Attorney, Agent, or Firm—Antonelli, Terry, Stout & Kraus, LLP

(57) ABSTRACT

A packet communication system which includes a first communication apparatus for transmitting input time information about input packets before transmitting the packets, and a second communication apparatus for receiving the input time information about the packets and transmitting the packets over a transmission path in an order based on the input time information. The first communication apparatus performs packet transmission in units of frames, each frame being composed of at least one packet. The second communication apparatus transmits the packets over the transmission path in chronological order of the input times of the packets input to the first communication apparatus.

16 Claims, 11 Drawing Sheets

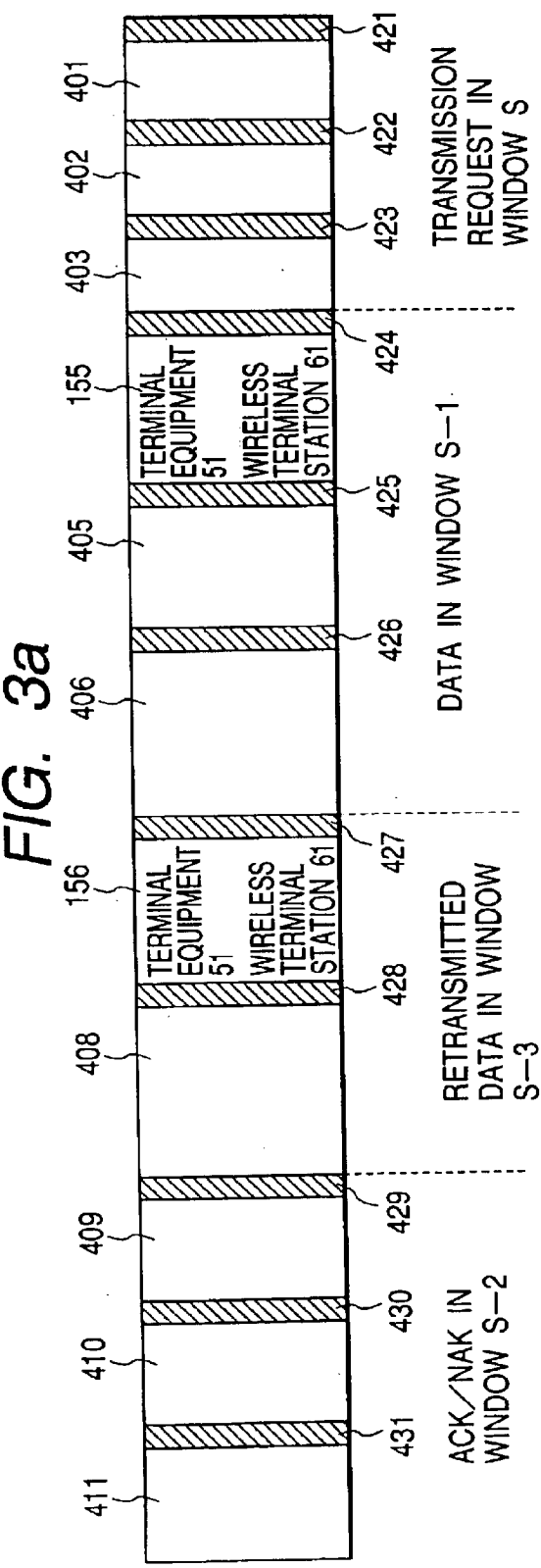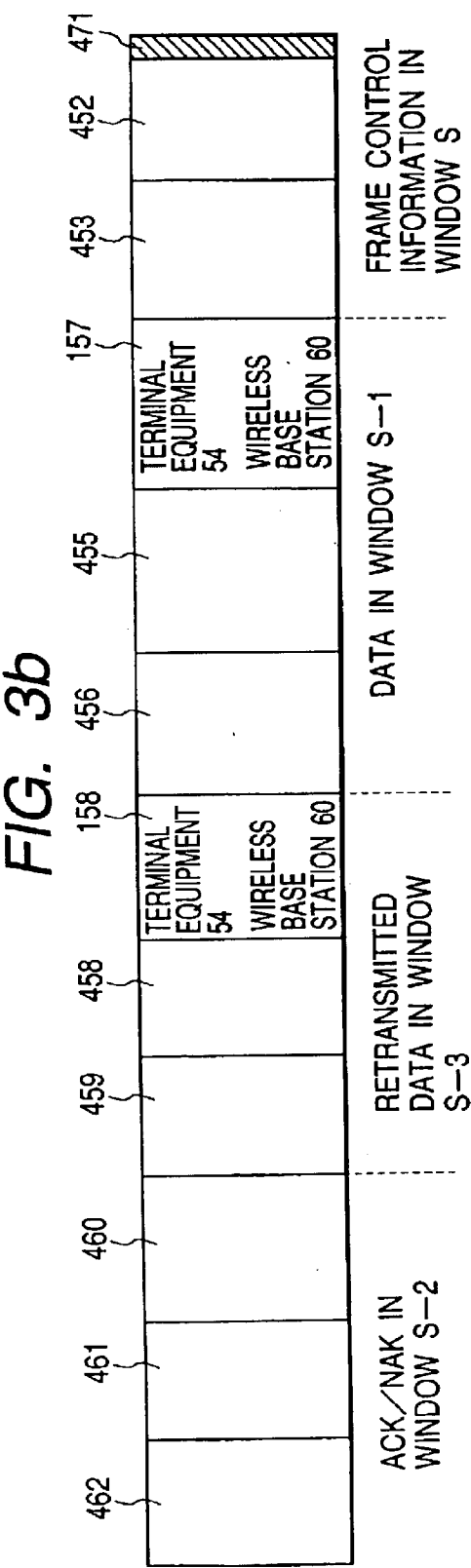

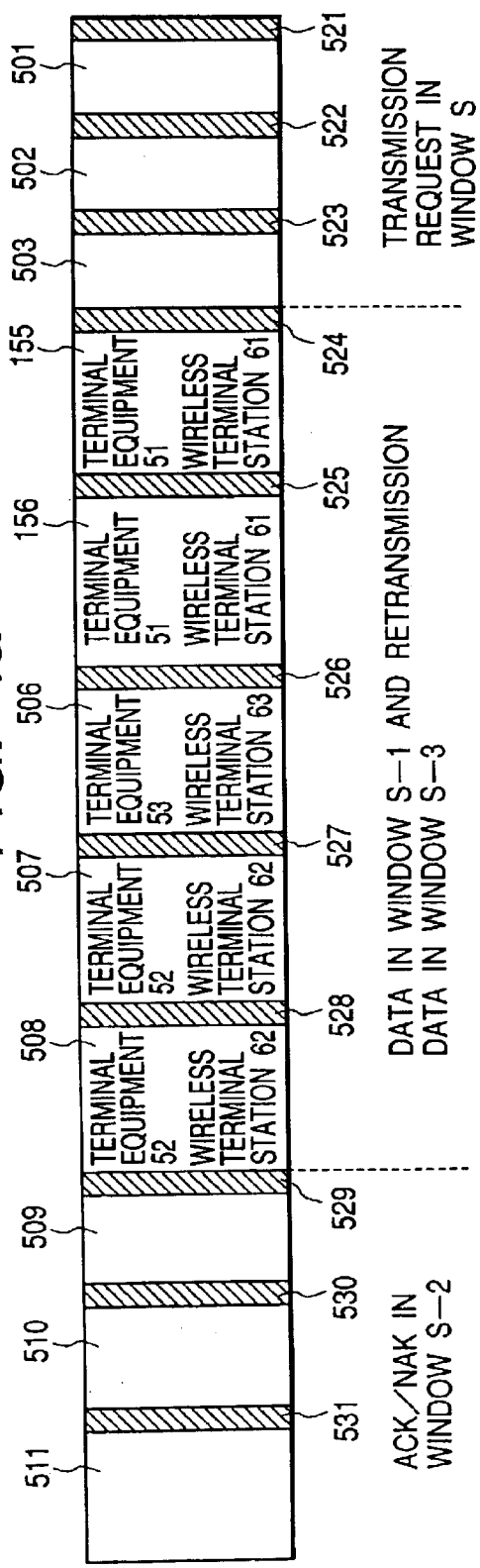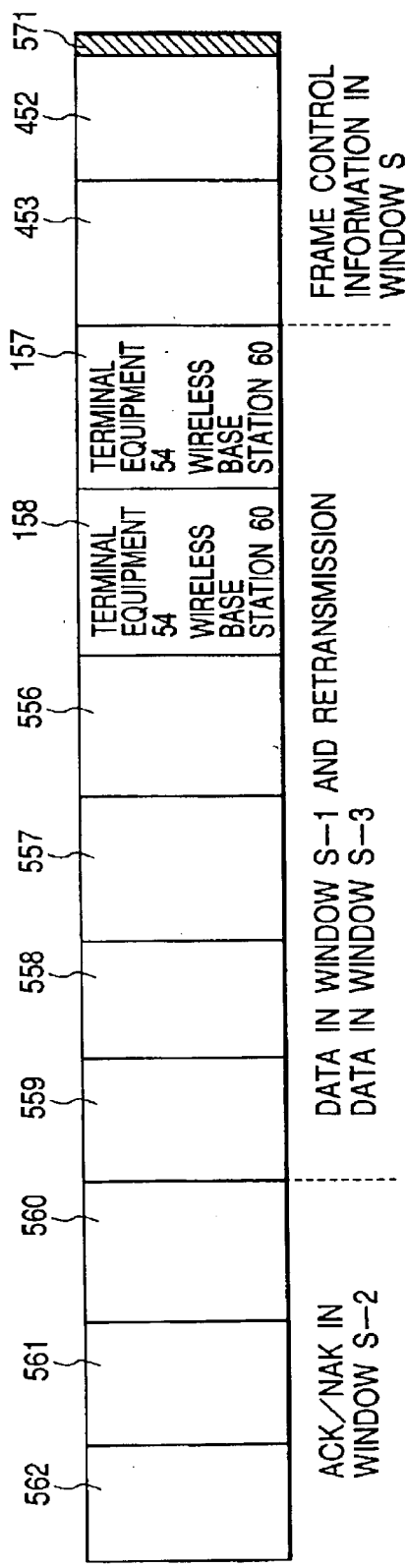

PACKET COMMUNICATION SYSTEM AND PACKET COMMUNICATION APPARATUS

BACKGROUND OF THE INVENTION

1. Field of the Invention

The present invention relates to a packet communication system and a packet communication apparatus adapted to control time delay variation of packet transmission.

2. Description of the Related Art

Two conventional techniques have been known for controlling time delay variation of packet transmission. They are a leaky bucket technique and a time-stamp technique. The leaky bucket technique involves having packets stored temporarily in a receiving-side buffer so that the packets are output onto a transmission path at an average packet rate, whereby time delay variation of packet transmission is controlled.

An improved version of the leaky bucket technique is what is known as a dynamic rate leaky bucket technique. This technique is designed to vary the output rate of the leaky bucket technique in keeping with a packet input rate. An example of the dynamic rate leaky bucket technique is disclosed in "Performance of Dynamic Rate Leaky Bucket Algorithm," Electronics Letters, pp. 1560–1561, Aug. 19, 1993, Vol. 29, No. 17.

The time-stamp technique is a technique which records in packet headers the times at which packets are input to a packet transmitting device so that a receiving side outputs these packets onto a transmission path in accordance with the times recorded in their headers, whereby time delay variation of packet transmission is controlled. This technique is characterized in that packet input time information is attached to each of the packets to be transmitted. An example of the time-stamp technique is disclosed in "A Cell Stream Multiplex Scheme Employing Time-Stamp Techniques for Wireless ATM," Technical Report of IEICE (The Institute of Electronics, Information and Communication Engineers), IN97-27, CS97-8, MVE98-8 (1997-4).

One disadvantage of the leaky bucket technique is its low level of temporal accuracy in time delay control. That is because packets are kept output at a constant rate from a receiving-side buffer whether the rate of packets input to a packet-transmitting side is increased or decreased.

One disadvantage of the time-stamp technique is its low level of packet transmission efficiency because of an overhead brought about when a large amount of time information is attached to each packet to enhance control time accuracy. Since reference time intervals at which to record time information remain constant for a given system, it is difficult to change the temporal accuracy in time delay variation in a flexible and simplified manner. Furthermore, the conventional techniques above are each constituted to have a delay time added at the receiving-side buffer in order to absorb time delay variation.

With any of the above techniques, once the time delay variation of packet transmission exceeds a tolerable range of absorption by the receiving-side buffer, the phenomenon called a buffer underflow occurs. That is, packets to be output have yet to arrive at the receiving side when the times at which to send them out have already passed.

A solution to the underflow problem would be to establish an increased delay variation time for absorption by the buffer. This method, if implemented, will promote delays at the buffer. To inhibit underflows without increased delays at the buffer requires minimizing the amount of time delay variation occurring in packet transmission sections.

SUMMARY OF THE INVENTION

It is therefore an object of the present invention to provide a packet communication system and a packet communication apparatus for minimizing the amount of time delay variation occurring in packet transmission sections.

In carrying out the invention and according to a first aspect thereof, there is provided a packet communication system comprising: a first communication apparatus for transmitting input time information about input packets before transmitting the packets; and a second communication apparatus for receiving the input time information about the packets and transmitting the packets over a transmission path in an order based on the input time information.

Preferably, the first communication apparatus may perform packet transmission in units of frames, each frame being composed of at least one packet. The input time information about the packets may be constituted by at least one of an input time and an input time interval for each of the packets input to the first communication apparatus. The second communication apparatus may transmit the packets over the transmission path in chronological order of the input times of the packets input to the first communication apparatus. The invention may also be applied where the packets are made of asynchronous transmission mode (ATM) cells.

The packet communication system of this invention is formed specifically by a wireless base station and one or a plurality of wireless terminal stations. Thus according to a second aspect of the invention, there is provided a wireless base station comprising: an interface for receiving a signal; a signal processing unit for attaching input time information to the signal; an access processing unit for transmitting the input time information before transmission of the signal; and a controller for assigning bandwidths at predetermined intervals. And according to a third aspect of the invention, there is provided a wireless terminal station comprising: an interface for receiving a signal; a signal processing unit for attaching input time information to the signal; and an access processing unit for transmitting the input time information before transmission of the signal.

According to a fourth aspect of the invention, there is provided a packet communication system comprising: a first communication apparatus for attaching to a frame input time information about at least one packet constituting the frame to be transmitted; and a second communication apparatus for receiving the frame to which the input time information about the packets was attached and for transmitting the packets over a transmission path in accordance with the input time information. Preferably, the input time information about the packets may be thinned out before being attached to the frame.

According to a fifth aspect of the invention, there is provided a packet communication system comprising: a first communication apparatus for attaching to a frame input time information about part of a plurality of packets constituting the frame to be transmitted; and a second communication apparatus for transmitting the packets having the input time information attached to the received frame over a transmission path in accordance with the input time information, the second communication apparatus further transmitting the other packets with no input time information attached to the frame over the transmission path at predetermined time intervals.

Preferably, the predetermined time intervals may be constant time intervals. Alternatively, the predetermined time intervals may be obtained by linearly approximating either time changes of packet input time intervals or a packet input rate.

As outlined, information about input times or input time intervals of packets (ATM cells) that are input to a packet communication apparatus is transmitted to a receiving-side packet communication apparatus before transmission of the packets. In the receiving-side packet communication apparatus, terminal equipment having the packets that were input the earliest to the transmitting-side packet communication apparatus gains preferentially the earliest access to the transmission medium. This scheme minimizes time delay variation of packet transmission in packet transmission sections, reducing the possibility of underflows and suppressing overflows in a buffer of a destination frame transmitter-receiver. Because the destination frame transmitter-receiver can control time delay variation of packet transmission in accordance with the input times or input rates of packets (ATM cells) that were input to a source frame transmitter-receiver, it is possible to attach to each packet its time-related information and to change packet output rates on the frame-receiving side in a flexible and simplified manner.

These and other objects, features and advantages of the present invention will become more apparent in view of the following detailed description of the preferred embodiments in conjunction with the accompanying drawings.

BRIEF DESCRIPTION OF THE DRAWINGS

FIGS. 3A and 3B are views showing an up-link frame configuration and a down-link frame configuration respectively;

FIGS. 4A and 4B are views depicting another up-link frame configuration and another down-link frame configuration respectively;

DESCRIPTION OF THE PREFERRED EMBODIMENTS

Figure 1:
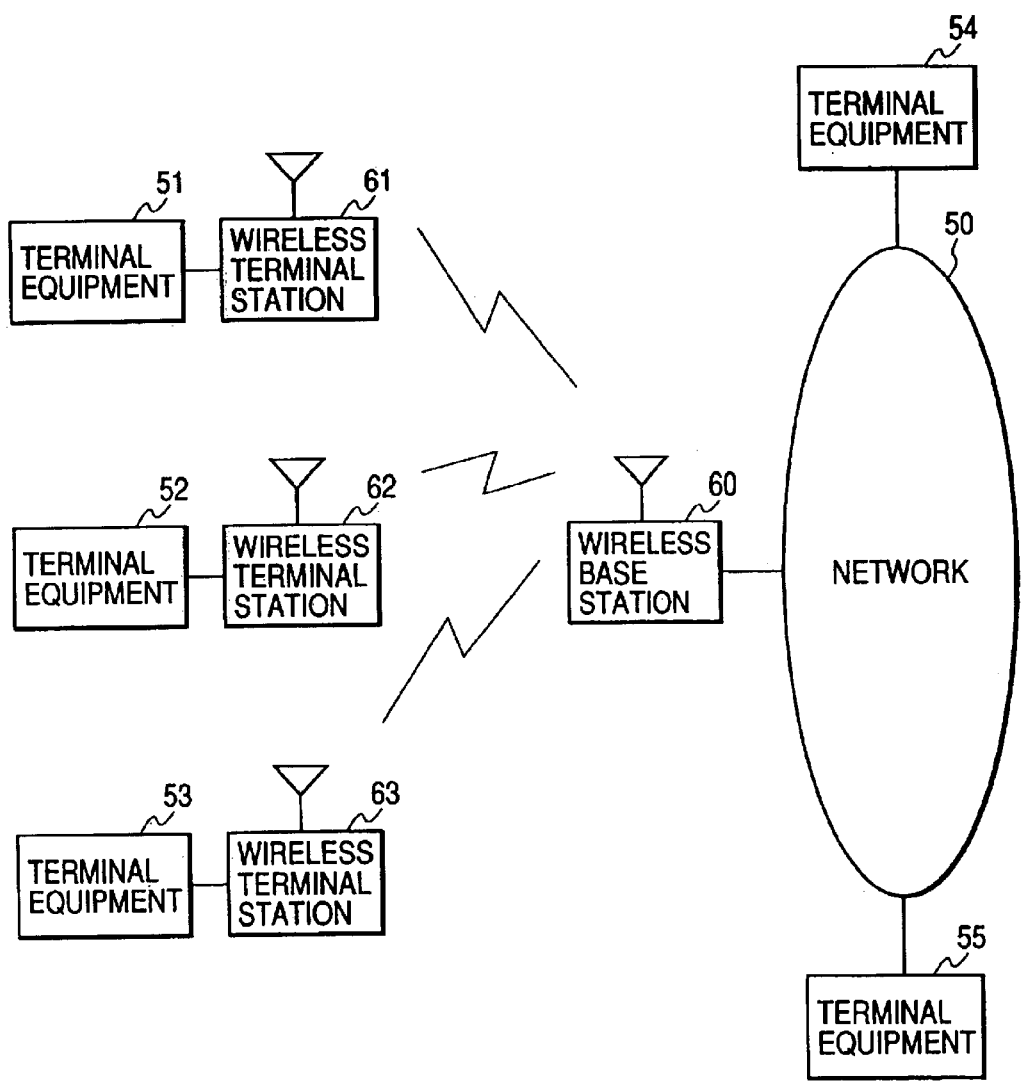
FIG. 1 is a schematic block diagram of a packet communication system embodying the invention.

FIG. 1 is a schematic block diagram of a packet communication system practiced as an embodiment of this invention. In FIG. 1, a network 50 comprises terminal equipment 54 and 55 connected to a wired network, and a wireless base station 60. Terminals 51, 52 and 53 are connected respectively to wireless terminal stations 61, 62 and 63. In that communication system, time delay variation of packet transmission between the wireless terminal stations 61 through 63 on the one hand and the wireless base station 60 on the other hand is controlled as outlined below.

Suppose that communication is to take place between the terminals 51 and 54 in the setup of FIG. 1. In that case, the wireless terminal station 61 transmits to the wireless base station 60 information about input times of packets from the terminal equipment 51 before transmitting the packets. The wireless base station 60 receives the packet input time information and transmits the packets over the network 50 in an order based on the input time information. The combination of the terminal equipment 51 and wireless terminal station 61 is interchangeable with the combination of the terminal equipment 52 and wireless terminal station 62 or with the combination of the terminal equipment 53 and wireless terminal station 63.

This embodiment uses two kinds of frame configuration: an up-link frame configuration and a down-link frame configuration. An up-link frame is transmitted by at least one of the wireless terminal stations 61, 62 and 63 to the wireless base station 60 in windows at time intervals of ΔT. A down-link frame is transmitted by the wireless base station 60 to at least one of the wireless terminal stations 61, 62 and 63 in windows at time intervals of ΔT.

Under control of the wireless base station 60, each of the wireless terminal stations 60, 61 and 62 gains access to a transmission medium on a time division duplex (TDD) basis in a time division multiple access (TDMA) setup.

Figure 2:
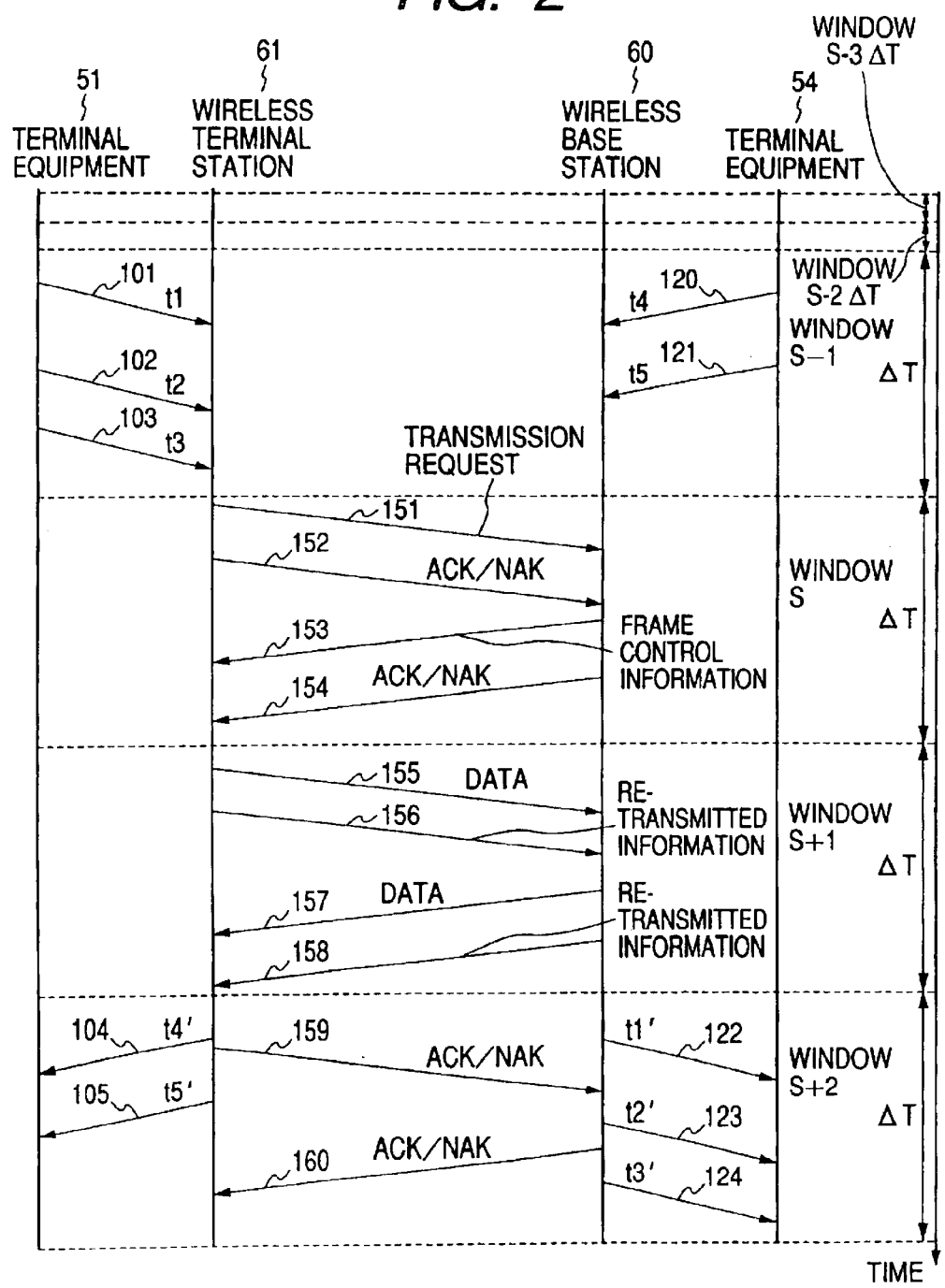
FIG. 2 is a schematic view of data transmitted and received between terminal equipment, a wireless terminal station, and a wireless base station.

FIG. 2 is a schematic view of data transmitted and received between the terminal equipment 51, the wireless terminal station 61, the wireless base station 60, and the terminal equipment 54. With this embodiment, the wireless base station 60 controls priorities in packet data transmission so that packets are transmitted in the chronological order in which they were input to the wireless terminal station 61.

In a window S–1 of FIG. 2, packets 101, 102 and 103 are input respectively at times t1, t2 and t3 to the wireless terminal station 61 from the terminal equipment 51. Packets 120 and 121 are input at times t4 and t5 respectively to the wireless base station 60 from the terminal equipment 54.

In a window S, the wireless terminal station 61 sends a transmission request 151 to the wireless base station 60. If packets having a fixed length each, the transmission request 151 contains the number of packets and information about relative or absolute input times of the packets input to the wireless terminal station 61. If packets have variable lengths, the transmission request 151 contains the number of packets, lengths of the packets to be transmitted, and information about relative or absolute input times of the packets input to the wireless terminal station 61.

The wireless terminal station 61 transmits an ACK (acknowledgement) or NAK (negative acknowledgement) 152 about data in a window S–3 to the wireless terminal station 60. The acknowledgement concerns information to be retransmitted using the same down-link frame as that for the data in the window S–1.

Upon receipt of the ACK/NAK 152, the wireless base station 60 determines configurations of up-link and down-link frames for communicating packet data in the window S–1. The frame configurations thus determined are sent as frame control information 153 to the wireless terminal station 61. The frame control information 153 includes information about relative or absolute input times of packets input to the wireless base station 60. At this point, the wireless base station 60 also sends to the wireless terminal station 61 an ACK/NAK 154 about information to be retransmitted using the same up-link frame as that for the data in the window S−1.

In a window S+1, the wireless terminal station 61 transmits to the wireless base station 60 data 155 of the packets 101, 102 and 103 using the frame configurations and timings notified by the frame control information 153, as well as retransmitted information 156 requested by the ACK/NAK 154.

The wireless base station 60 transmits to the wireless terminal station 61 data 157 of the packets 120 and 121 using the frame configurations and timings notified to the station 61 by the frame control information 153, as well as retransmitted information 158 requested by the ACK/NAK 152. The information about the relative or absolute input times of the packets 120 and 121 input to the wireless terminal station 61 is attached to the data 157 when transmitted.

In a window S+2, the wireless terminal station 61 reassembles the packets 120 and 121 into packets 104 and 105 based on the data 157 of the packets 120 and 121 and on the frame control information 153 using the information about the relative or absolute input times of the packets input to the wireless base station 60, the wireless terminal station 61 transmits the packets 104 and 105 to the terminal equipment 51 at times t4' and t5' respectively. The times t4' and t5' are defined as t4'=t4+T t5'=t5+T where T is a constant time interval.

Meanwhile, the wireless base station 60 reassembles the packets 101, 102 and 103 into packets 122, 123 and 124 based on the data 155 of the packets 101, 102 and 103. Using the information about the relative or absolute input times of the packets input to the wireless terminal station 61, the wireless base station 60 transmits the packets 122, 123 and 124 to the terminal equipment 54 at times t1', t2' and t3' respectively. The times t1', t2' and t3' are defined as t1'=t1+T t2'=t2+T t3'=t3+T where T is a constant time interval.

If the wireless terminal 61 has detected error in the data 157 of the packet 104 or 105, the station 61 transmits an ACK/NAK 159 to the wireless base station 60. Conversely, if the wireless base station 60 has detected error in the data 155 of the packet 101, 102 or 103, the station 60 transmits an ACK/NAK 160 to the wireless terminal station 61.

FIGS. 3A and 3B show respectively an up-link frame configuration and a down-link frame configuration in a window S+1. As illustrated, frames are provided individually with preambles 421 through 431 and 471 for synchronization between wireless stations.

The up-link frame of FIG. 3A comprises three transmission requests arranged consecutively: a transmission request 401 for the packets input to the wireless terminal station 61 in a window S, a transmission request 402 for the packets input to the wireless terminal station 62 in the window S, and a transmission request 403 for the packets input to the wireless terminal station 63 in the window S.

Data in a window S−1 are of three kinds arranged successively: data 155 of the packets input to the wireless terminal station 61, data 405 of the packets input to the wireless terminal station 62, and data 406 of the packets input to the wireless terminal station 63. Retransmitted data in a window S−3 are of two kinds arranged consecutively: retransmitted data 156 of the packets input to the wireless terminal station 61, and retransmitted data 408 of the packets input to the wireless terminal station 62.

There are three kinds of acknowledgement arranged consecutively in a window S−2 and input to the wireless base station 60. They are an ACK/NAK 409 in response to the data in the packets sent to the wireless terminal station 61, an ACK/NAK 410 responding to the data in the packets sent to the wireless terminal station 62, and an ACK/NAK 411 in reply to the data in the packets sent to the wireless terminal station 63.

The down-link frame of FIG. 3B comprises two kinds of frame control information arranged successively in the window S: up-link frame control information 452 and down-link frame control information 453.

Data in the window S−1 are of three kinds arranged successively: packet data 157 input to the wireless base station 60 from the terminal equipment 54, packet data 455 input to the wireless base station 60 from the terminal equipment 55, and packet data 456 input to the wireless base station 60 from the wireless terminal station 53.

Retransmitted data in the window S−3 are of three kinds arranged consecutively: retransmitted data 158 of the packets input to the wireless base station 60 from the terminal equipment 54, retransmitted data 458 of the packets input to the wireless base station 60 from the terminal equipment 55, and retransmitted data 459 of the packets input to the wireless base station 60 from the wireless terminal station 53.

There are three kinds of acknowledgement arranged consecutively in the window S−2: an ACK/NAK 460 in response to the data of the packets input to the wireless terminal station 61 from the terminal equipment 51, an ACK/NAK 461 in reply to the data of the packets input to the wireless terminal station 62 from the terminal equipment 52, and an ACK/NAK 462 responding to the data of the packets input to the wireless terminal station 63 from the terminal equipment 53.

The examples of FIGS. 3A and 3B have shown frame configurations whereby first-time transmitted data are given higher priority than retransmitted data at the time of their transmission. Alternatively, retransmitted data may take precedence over first-time transmitted data or may be given the same priority as the latter upon transmission. As another alternative, the wireless base station 60 may provide access control such that the data with the shortest lead time up to their scheduled packet output time are given the highest priority, the data with the second-shortest lead time up to their schedule packet output time are given the second-highest priority, and so on.

In the example of the up-link frame in FIG. 3A, the terminal equipment 51 connected to the wireless terminal station 61 is given the highest priority in accessing the transmission medium for data transmission in the window S−1. For data retransmission in the window S−3, the terminal equipment 51 connected to the wireless terminal station 61 is likewise given the highest priority in gaining access to the transmission medium.

In the example of the down-link frame in FIG. 3B, the terminal equipment 54 is given the highest priority in accessing the transmission medium. Whereas this example constitutes a setup in which terminals gain access to the medium in order of their priorities, it is also possible for the terminals to furnish their data with a powerful error correction code for transmission in order of their priorities.

FIGS. 4A and 4B depict respectively another up-link frame configuration and another down-link frame configuration in a window S+1. As illustrated, frames are provided individually with preambles 521 through 531 and 571 for synchronization between wireless stations. In the up-link frame configuration, the wireless terminal stations 61, 63 and 62 are given priorities in that order. In the down-link frame configuration, the terminal equipment 54 is given the highest priority. If the same terminal is to send out both retransmitted data and first-time transmitted data, the first-time transmitted data are given higher priority than the retransmitted data.

The up-link frame of FIG. 4A comprises three transmission requests arranged consecutively: a transmission request 501 for the packets input to the wireless terminal station 61 in a window S, a transmission request 502 for the packets input to the wireless terminal station 62 in the window S, and a transmission request 503 for the packets input to the wireless terminal station 63 in the window S.

Transmitted data in a window S−1 and retransmitted data in a window S−3 comprise the following data arranged consecutively: first-time transmitted data 155 from the terminal equipment 51, retransmitted data 156 from the terminal equipment 51, first-time transmitted data 506 from the terminal equipment 53, first-time transmitted data 507 from the terminal equipment 52, and retransmitted data 508 from the terminal equipment 52.

There are three kinds of acknowledgement arranged consecutively in a window S−2 and input to the wireless base station 60. They are an ACK/NAK 509 in response to the data of the packets to the wireless terminal station 61, an ACK/NAK 510 in reply to the data of the packets to the wireless terminal station 62, and an ACK/NAK 511 responding to the data of the packets to the wireless terminal station 63.

The down-link frame of FIG. 4B comprises two kinds of frame control information arranged successively in the window S: up-link frame control information 452 and down-link frame control information 453.

Transmitted data in the window S−1 and retransmitted data in the window S−3 comprise the following data arranged consecutively: first-time transmitted data 157 from the terminal equipment 54, retransmitted data 158 of the packets from the terminal equipment 54, first-time transmitted data 556 from the terminal equipment 55, retransmitted data 557 from the terminal equipment 55, first-time transmitted data 558 from the terminal equipment 53, and retransmitted data 559 of the packets from the wireless terminal station 53.

There are three kinds of acknowledgement arranged consecutively in the window S−2: an ACK/NAK 560 in response to the data of the packets input to the wireless terminal station 61 from the terminal equipment 51, an ACK/NAK 561 in reply to the data of the packets input to the wireless terminal station 62 from the terminal equipment 52, and an ACK/NAK 562 responding to the data of the packets input to the wireless terminal station 63 from the terminal equipment 53.

In FIGS. 4A and 4B, the up-link and down-link frames have the highest priority assigned to the terminal equipment 51 and 54 respectively. With the up-link frame, on the basis of transmission requests from the wireless terminal stations 61, 62 and 63, the wireless base station 60 prioritizes the terminal equipment so that the terminal connected to the wireless terminal station at which packets (or ATM cells) arrived first is given the highest priority, the terminal connected to the wireless terminal station at which packets arrived second is given the next-highest priority, and so on. With the down-link frame, the wireless base station 60 prioritizes the terminal equipment in such a manner that the terminal whose packets (or ATM cells) arrived first at the station 60 is given the highest priority, the terminal whose packets arrived second at the station 60 is given the second-highest priority, and so on.

Figure 5:
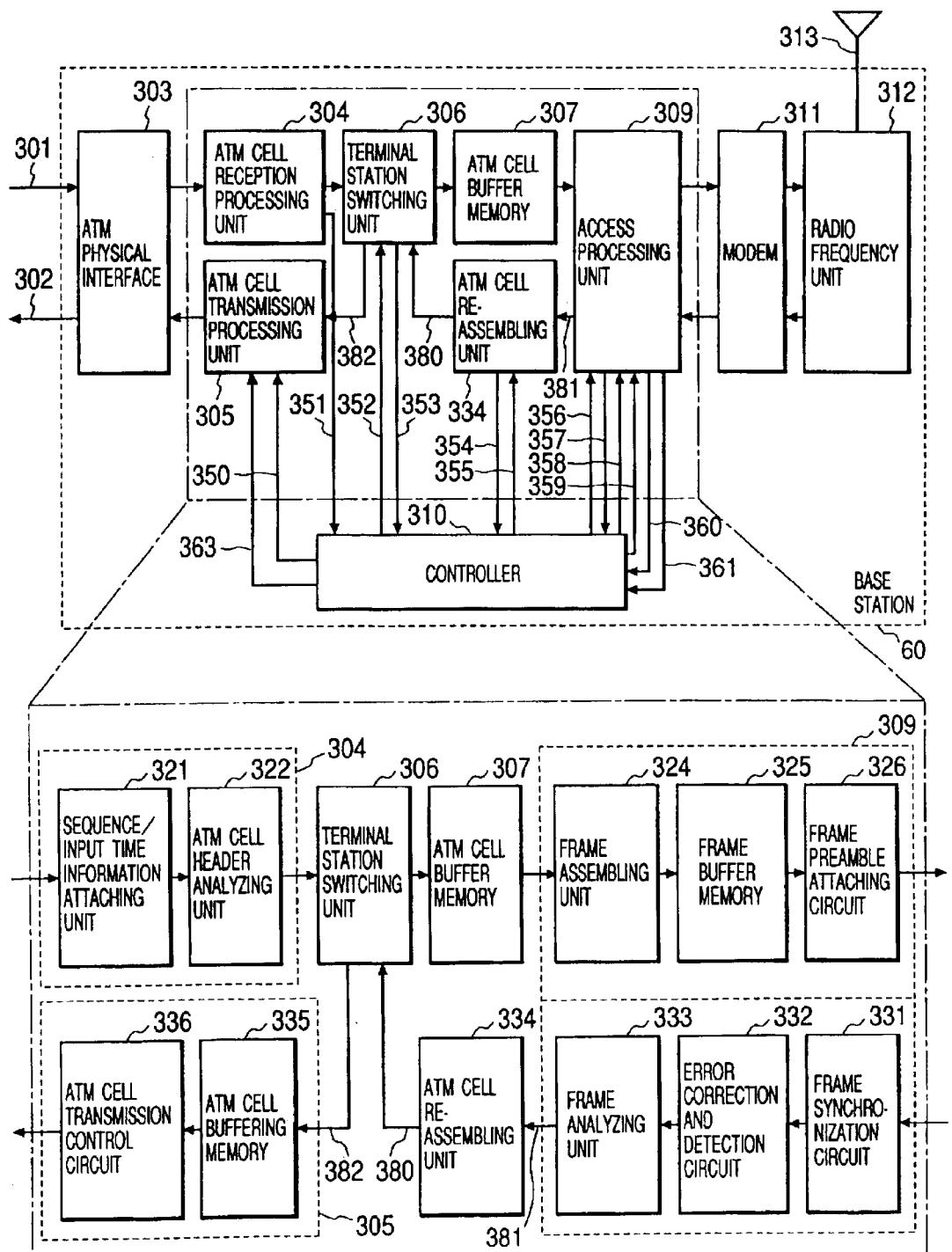
FIG. 5 is a block diagram of a typical wireless base station.

FIG. 5 is a block diagram of a typical wireless base station 60 in the system of FIG. 1 wherein ATM (asynchronous transmission mode) cells are transmitted as packets. As illustrated, the wireless base station 60 comprises an ATM physical interface 303 connected to transmission paths 301 and 302; an ATM cell reception processing unit 304 and an ATM cell transmission processing unit 305 connected to the ATM physical interface 303; a terminal station switching unit 306 connected to the processing units 304 and 305; a buffer memory 307 and an ATM cell reassembling unit 334 connected to the terminal station switching unit 306; an access processing unit 309 connected to the buffer memory 307 and ATM cell reassembling unit 334; a controller 310 for controlling the configured components; a MODEM 311 connected to the access processing unit 309; a radio frequency unit 312 connected to the MODEM 311; and an antenna 313 connected to the radio frequency unit 312.

The ATM cell reception processing unit 304 includes a sequence/input time information attaching unit 321 and an ATM cell header analyzing unit 322. The ATM transmission processing unit 305 is made up of an ATM cell buffer memory 335 and an ATM cell transmission control circuit 336. The access processing unit 309 is constituted by a frame assembling unit 324, a frame buffer memory 325, a frame preamble attaching circuit 326, a frame synchronizing circuit 331, an error correction and detection circuit 332, and a frame analyzing unit 333.

How the wireless base station 60 operates will now be described. For signal transmission to wireless terminal stations, the wireless base station 60 first inputs ATM cells 120 and 121 to the ATM physical interface 303 from the path 301 via the network 50. On receiving the ATM cells, the ATM physical interface 303 checks HEC (header error control) fields in the headers of the received cells.

In the ATM cell reception processing unit 304, the sequence/input time information attaching unit 321 attaches sequences and times t4 and t5 to the received ATM cells. The times t4 and t5 denote the times at which the ATM cells 120 and 121 were input respectively.

The ATM cell header analyzing unit 322 analyzes the headers of the ATM cells. Using a signal 351, the ATM cell header analyzing unit 322 notifies the controller 310 of a VPI (virtual path identifier)/VCI (virtual channel identifier) specific to each analyzed ATM cell.

Using a signal 352, the controller 310 notifies the terminal station switching unit 306 of relations of correspondence between VPIs/VCIs on the one hand and the terminals 51 through 53 on the other hand. The terminal station switching unit 306 transmits the ATM cells to the buffer memory 307 corresponding to the terminals 51 through 53. With the ATM cell transmission completed, the switching unit 306 notifies the controller 310 thereof by use of a notice signal 353 for notifying completion of transmission.

In windows at time intervals of ΔT, the controller 310 assigns bandwidths to the wireless base station 60 as well as to the wireless terminal stations accommodated by the wireless base station 60 using a signal 356, the controller 310 then notifies the access processing unit 309 of the relevant frame configurations and frame transmission timings.

In the access Processing unit 309, the frame assembling unit 324 assembles frames using the above-mentioned frame control information 452 and 453 based on the notification of the signal 356. The frames thus assembled are written to the frame buffer memory 325. More specifically, the frame assembling unit 324 first reads from the buffer memory 307 the times t4 and t5 at which the ATM cells 120 and 121 were input. In accordance with the notification of the signal 356, the frame assembling unit 324 then multiplexes the ATM cells, attaches error correction and detection codes to the cells, and put the cells in sequence.

It may happen that the controller 310 forwards to the access processing unit 309 a retransmission request 358 destined for a wireless terminal station in connection with the frames transmitted from the latter. In such a case, the frame assembling unit 324 writes NAK (negative acknowledgement) to ACK/NAK 460, 461 and 462 regarding the frames to be retransmitted; the frame assembling unit 324 writes ACK (acknowledgement) regarding any frame that need not be retransmitted. The ACK/NAK 460, 461 and 462 thus assembled are written to the frame buffer memory 325.

At points in time notified by a frame transmission instruction signal 356, the frame preamble attaching circuit 326 reads from the frame buffer memory 325 the frame control information 452 and 453; data 157, 455 and 456 to be transmitted for the first time; data 158, 458 and 459 requested to be retransmitted by the controller 310 using a signal 359; and ACK/NAK 460, 461 and 462 to be retransmitted. The frame preamble attaching circuit 326 attaches a preamble to each of the retrieved frames and sends the frames to the MODEM 311.

The MODEM 311 modulates the input frame information and forwards the modulated information to the radio frequency unit 312. In turn, the radio frequency unit 312 transmits a modulated signal carrying the information from the antenna 313 over a radio transmission path.

Below is a description of how a signal from a wireless terminal station is received by the wireless base station 60. The signal is first received by the antenna 313 and sent to the MODEM 311 through the radio frequency unit 312. The MODEM 311 demodulates the received signal and sends the demodulated result to the access processing unit 309. In the access processing unit 309, the frame synchronizing circuit 331 synchronizes the frames involved. The error correction and detection circuit 332 detects any error and corrects one that may be detected. If no error is detected or an error was found but has been corrected by the circuit 332, the frame analyzing unit 333 analyzes the frame headers and sends to the controller 310 a notice signal 357 for notifying completion of transmission. If an error was detected but has not been corrected by the error correction and detection circuit 332, the frame analyzing unit 333 discards any frame with an erroneous frame header. In the case of the frames having correct frame headers, the frame analyzing unit 333 analyzes these frame headers and sends to the controller 310 a retransmission request signal 360 designating a frame sequence. The controller 310 sends to the access processing unit 309 a retransmission request signal 358 destined for the wireless terminal station in connection with the frames designated by the retransmission request 360.

When transmission request frames and ACK/NAK are received correctly from wireless terminal stations, these frames are analyzed by the frame analyzing unit 333. If the received frame is a transmission request frame, a signal 361 is used to notify the controller 310 of the sequence and VPI/CCI of each ATM cell as well as the time at which each ATM was input to the terminal station in question. If the received are ACK/NAK, the signal 361 is used to notify the controller 310 of the sequence and ACK/NAK of each frame.

With regard to the frames whose NAK was notified by the signal 361 as well as the frames whose ACK has not been notified for a predetermined period of time, the controller 310 sends to the access processing unit 309 a retransmission request signal 359 destined for the wireless base station. In addition, the controller 310 assigns bandwidths through the use of the number of ATM cells input to each wireless terminal station, the QOS (quality of services) required of each ATM cell as revealed by its VPI/VCI, or the times at which the cells were input to the respective wireless terminal stations.

Using a signal 355, the controller 310 notifies the ATM cell reassembling unit 334 of the constitution of the frames that have all been received. On the basis of a signal 381, the ATM cell reassembling unit 334 reassembles ATM cells without HEC fields from the received frames. With the ATM cells reassembled, the ATM cell reassembling unit 334 sends an ATM cell reassembly notice signal 354 to the controller 310. The ATM cell reassembling unit 334 also sends a signal 380 to the terminal station switching unit 306. The signal 380 causes the terminal station switching unit 306 to perform two things: to write to the ATM cell buffer memory 335, using a signal 382, the ATM cells destined for the terminal connected to the transmission path 302; and to write to the ATM cell buffer memory 307 the ATM cells destined for the terminal connected to the wireless terminal station in question.

Using the signal 352, the controller 310 notifies the terminal station switching unit 306 of relations of correspondence between VPIs/VCIs and the terminal equipment. The terminal station switching unit 306 transmits the ATM cells to the buffer memory 307 corresponding to the terminals 51, 52 and 53. With the ATM cell transmission completed, the switching unit 306 notifies the controller 310 thereof by use of the notice signal 353 for notifying completion of transmission.

The controller 310 performs congestion control on the ATM cells transmitted from the wireless terminal stations. Using a cell transmission control signal 350, the controller 310 notifies the ATM cell transmission control circuit 336 of an ATM cell transmission sequence. The controller 310 also sends a cell transmission time control signal 363 to the ATM cell transmission control circuit 336. Based on the timings in the signal 363 and the sequences in the signal 350, the ATM cell transmission control circuit 336 transmits the ATM cells to the ATM physical interface 303. In turn, the ATM physical interface 303 attaches HEC fields to the input ATM cells before outputting them onto the wired transmission path 302.

Figure 6:
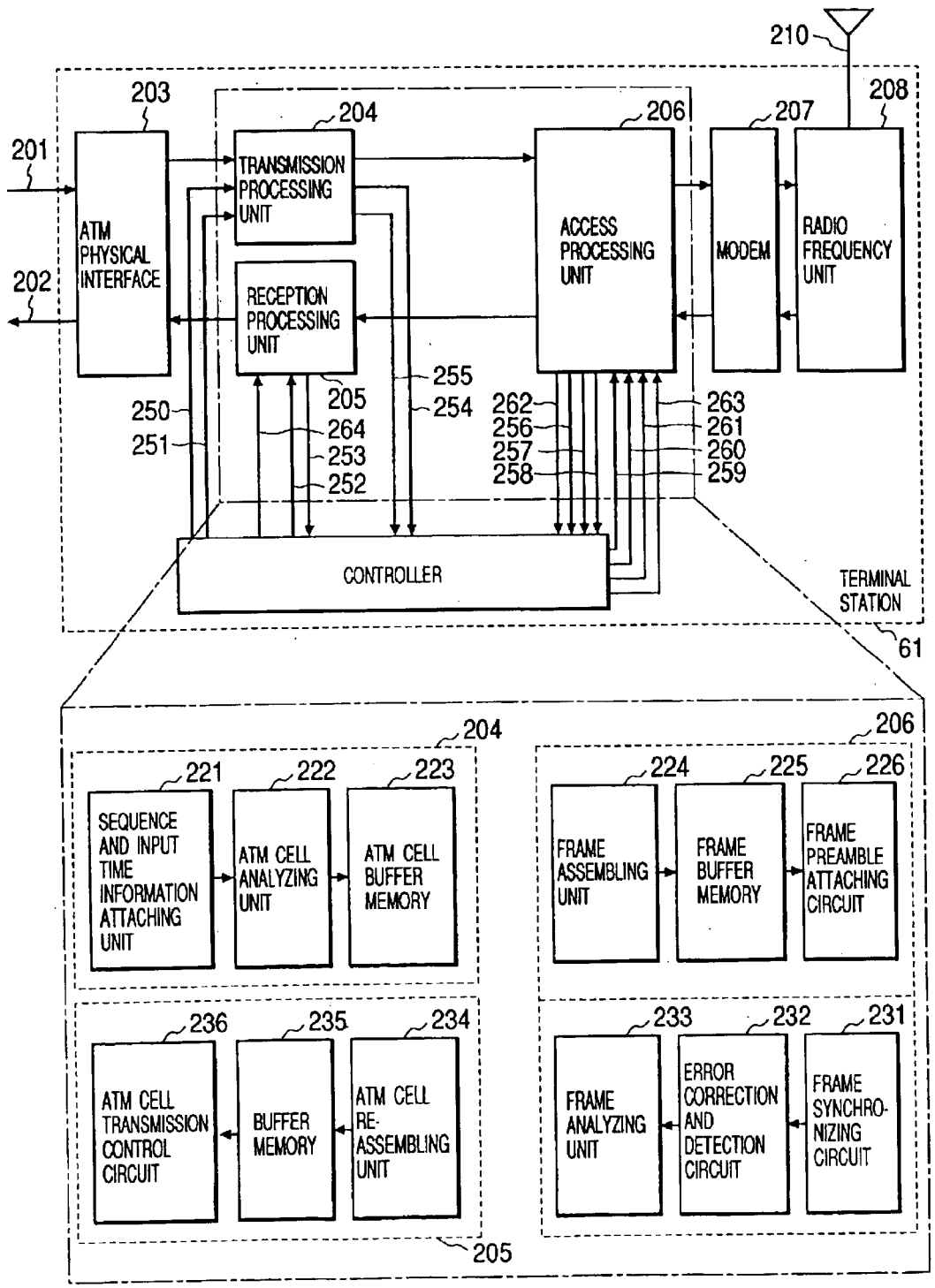
FIG. 6 is a block diagram of a typical wireless terminal station.

FIG. 6 is a block diagram showing a typical constitution of the wireless terminal station 61 for transmitting ATM cells as packets in the system of FIG. 1. The wireless terminal stations 62 and 63 may also have the same constitution each.

As illustrated, the wireless terminal station 61 comprises an ATM physical interface 203 connected to wired transmission paths 201 and 202; an ATM cell reception processing unit 204 and an ATM cell transmission processing unit 205 connected to the ATM physical interface 203; an access processing unit 206 connected to the two processing units 204 and 205; a MODEM 207 connected to the access processing unit 206; a radio frequency unit 208 connected to the MODEM 207; an antenna 210 connected to the radio frequency unit 208; and a controller 209 for controlling the configured components.

The ATM cell reception processing unit 204 is constituted by a sequence/input time information attaching unit 221, an ATM cell header analyzing unit 222, and an ATM cell buffer memory 223. The ATM cell transmission processing unit 205 is made up of an ATM cell reassembling unit 234, an ATM cell buffer memory 235, and an ATM cell transmission control circuit 236. The access processing unit 206 is formed by a frame assembling unit 224, a frame buffer memory 225, a frame preamble attaching circuit 226, a frame synchronizing circuit 231, an error correction and detection circuit 232, and a frame analyzing unit 233.

How the wireless terminal station 61 works will now be described. For signal transmission to the wireless base station 60, the wireless terminal station 61 first inputs ATM cells 101, 102 and 103 to the ATM physical interface 203 over the wired transmission path 201 from the terminal equipment 51. On receiving the ATM cells, the ATM physical interface 203 checks HEC fields in the headers of the received cells.

In the ATM cell reception processing unit 204, the sequence/input time information attaching unit 221 attaches sequences and times t1, t2 and t3 to the received ATM cells. The times t1, t2 and t3 denote the times at which the ATM cells 101, 102 and 103 were input respectively.

The ATM cell header analyzing unit 222 analyzes the headers of the ATM cells. Using a signal 255, the ATM cell header analyzing unit 222 notifies the controller 209 of a VPI/VCI specific to each of the analyzed ATM cells, their input times t1, t2 and t2 and their sequences. Furthermore, the ATM cell header analyzing unit 222 writes the analyzed ATM cells together with their sequences to the ATM cell buffer memory 223. With the writing of the cells completed, the ATM cell header analyzing unit 222 sends a write complete notice signal 254 to the controller 209.

In windows at time intervals of ΔT, the controller 209 sends to the access processing unit 206 a frame assembling instruction signal 259 for a transmission request frame regarding the ATM cells 101, 102 and 103. In the access processing unit 206, the frame assembling unit 244 assembles a transmission request frame 401 containing information denoting the cell count, the sequences and VPIs/VCIs of the ATM cells 101, 102 and 103, and the times t1, t2 and t3. The frame 401 thus assembled is written to the frame buffer memory 225. A write complete notice signal 256 is used to notify the controller 209 that the writing of the assembled frame is completed.

At a point in time notified by a frame assembling instruction signal 259, the frame preamble attaching circuit 226 reads from the frame buffer memory 225 the transmission request frame 401, attaches a preamble 421 to the frame and forwards the preamble-equipped frame to the MODEM 207. The MODEM 207 modulates the input transmission request frame 401 and preamble 421 into a modulated signal and forwards the signal to the radio frequency unit 208. In turn, the radio frequency unit 208 transmits the modulated signal from the antenna 210 to a transmission medium (radio transmission path). With this embodiment, as described above, the time information contained in the transmission request frame 401 is transmitted ahead of packet data (discussed later).

On the basis of the received transmission request 401, the wireless base station 60 assigns a bandwidth to the wireless terminal station 61 and notifies the latter of the assigned bandwidth using up-link frame control information 452 and down-link frame control information 453.

In accordance with the up-link frame control information 452, the wireless terminal station 61 assembles frames and gains access to a wireless transmission path. The wireless terminal station 61 also reassembles the ATM cells from the down-link frames based on the down-link frame control information 453.

The controller 209 sends to the access processing unit 206 a frame assembling instruction signal 260 including the frame configuration of the ATM cells 101, 102 and 103 as well as frame transmission timing information. In the access processing unit 206, the frame assembling unit 224 reads the ATM cells 101, 102 and 103 and their sequence from the ATM cell buffer memory 223. The frame assembling unit 224 then multiplexes the ATM cells, attaches error correction and detection codes to the cells, and assembles the cells into a frame 155.

The frame assembling unit 224 writes the frame 155 to the frame buffer memory 225 and, using a write complete notice signal 256, notifies the controller 209 that the writing of the frame is completed. At a point in time notified by the frame assembling instruction signal 260, the frame preamble attaching circuit 226 reads from the frame buffer memory 225 the transmission request frame 155, attaches a preamble 424 to the frame and forwards the preamble-equipped frame to the MODEM 207. The MODEM 207 modulates the input transmission request frame 155 and preamble 424 into a modulated signal and forwards the signal to the radio frequency unit 208. In turn, the radio frequency unit 208 transmits the modulated signal from the antenna 210 over a radio transmission path.

Of the frames transmitted from the wireless terminal station 61, those whose NAK was notified as well as those whose ACK has not been notified for a predetermined period of time prompt the controller 209 to send a frame retransmission request signal 261 to the access processing unit 206. At a point in time notified by the frame assembling instruction signal 260, the frame preamble attaching circuit 226 reads from the frame buffer memory 225 a frame 156 requested to be retransmitted by the frame retransmission request signal 261, prefixes a preamble 427 to the frame and forwards the preamble-equipped frame to the MODEM 207. The MODEM 207 modulates the input frame 156 and preamble 427 into a modulated signal and forwards the signal to the radio frequency unit 208. In turn, the radio frequency unit 208 transmits the modulated signal from the antenna 210 over a radio transmission path.

Meanwhile, the radio frequency unit 208 supplies the MODEM 207 with a signal received by the antenna 210. The MODEM 207 demodulates the received signal and sends the demodulated result to the access processing unit 206. In the access processing unit 206, the frame synchronizing circuit 231 synchronizes the frames involved.

The error correction and detection circuit 232 detects any error and corrects one that may be detected. If no error is detected or an error was found but has been corrected by the circuit 232, the frame analyzing unit 233 analyzes the frame headers and sends to the controller 209 a signal 257 for notifying completion of transmission. If an error was detected but has not been corrected by the error correction and detection circuit 232, the frame analyzing unit 233 discards any frame with an erroneous frame header. If the frames have correct frame headers, the frame analyzing unit 233 analyzes these frame headers and sends to the controller 209 a retransmission request signal 258 designating a frame sequence.

In accordance with the retransmission request signal 258, the controller 209 sends to the access processing unit 206 a retransmission request signal 263 destined for the wireless base station 60. When the ACK/NAK have been correctly received from the wireless base station 60, the frame analyzing unit 233 in the access processing unit 206 analyzes the frames and notifies the controller 209 of the sequence and ACK/NAK of each frame using a signal 262.

With regard to the frames whose NAK was notified by the signal 262 as well as the frames whose ACK has not been notified for a predetermined period of time, the controller 209 sends to the access processing unit 206 the retransmission request signal 261 destined for the wireless base station 60. Furthermore, the controller 209 sends control signal 250 and 251 to the ATM cell transmission processing unit 204 and control signals 252, 253 and 264 to the ATM cell reception processing unit 205.

As described, the above embodiment allows a destination frame transmitter-receiver to receive input time or input rate information about packets (ATM cells) input to a source frame transmitter-receiver, before receiving information in the payload portions of the packets. At the destination frame transmitter-receiver, the terminal getting the packets input the earliest to the source frame transmitter-receiver is given the highest priority for access, the terminal getting the packets input next to the source frame transmitter-receiver is given the next-highest priority for access, and so on. This arrangement minimizes time delay variation of packet transmission, thereby reducing the possibility of buffer underflows at the destination frame transmitter-receiver.

According to the invention, the packet input time or input time interval information about the packets (ATM cells) input to a transmitting-side packet communication apparatus is transmitted to a receiving-side packet communication apparatus ahead of the packets; at the receiving-side packet communication apparatus, the terminal getting the packets input the earliest to the transmitting-side communication apparatus is given the highest priority for access, the terminal getting the packets input next to the source frame transmitter-receiver is given the next-highest priority for access, and so on. This arrangement minimizes time delay variation in packet transmission sections and thus reduces the possibility of buffer underflows at the destination frame transmitter-receiver.

Figure 7A:
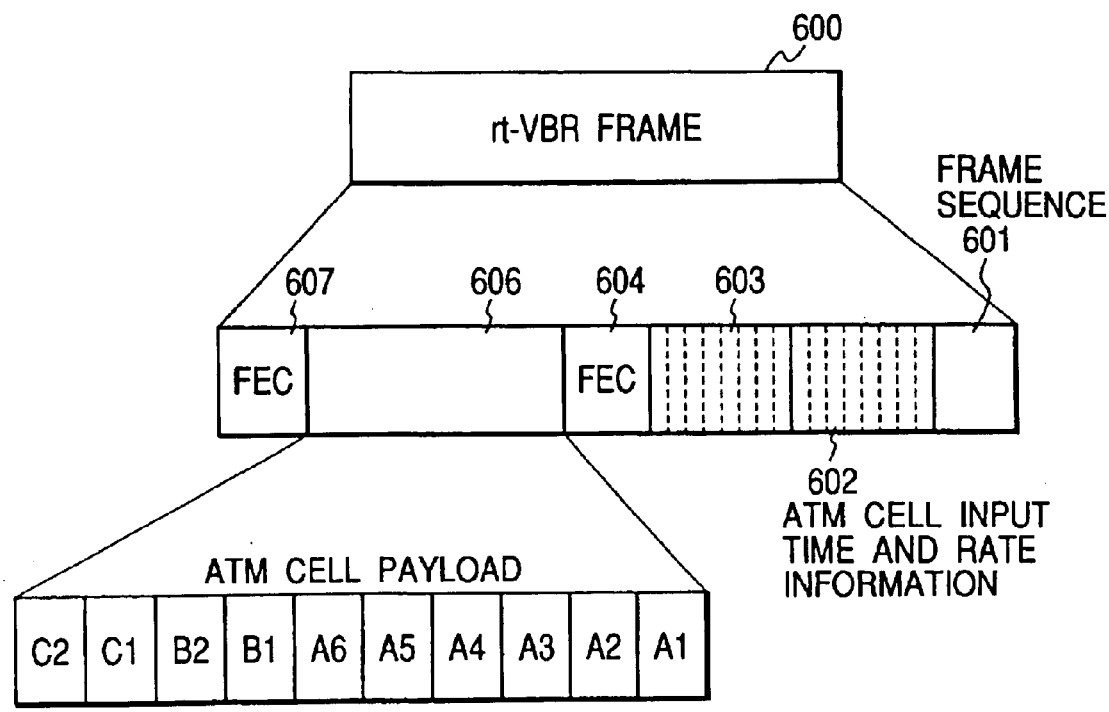
FIGS. 7A and 7B are schematic views illustrating ATM cells having arrived at a wireless base station.
Figure 7B:
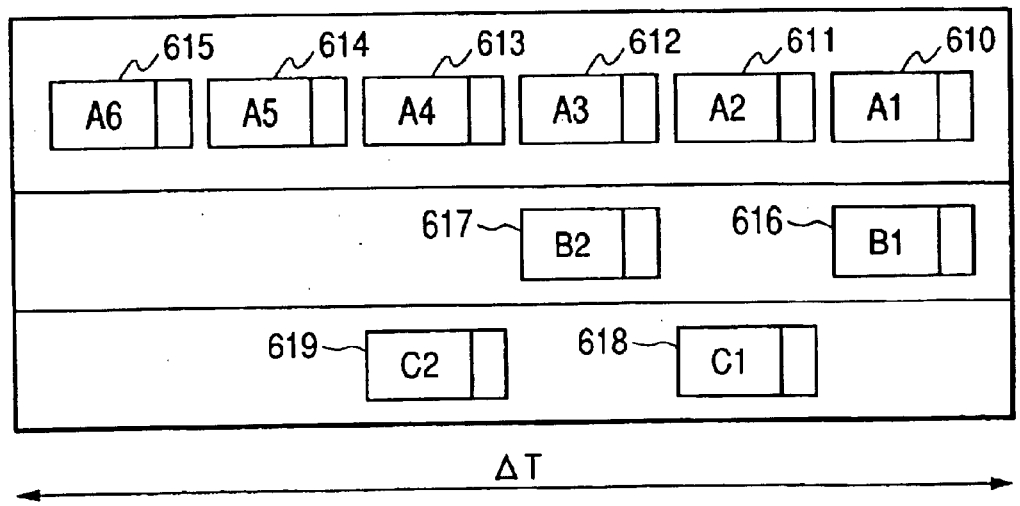

FIGS. 7A and 7B are provided to help explain another embodiment of the invention. FIGS. 7A and 7B are schematic views illustrating an ATM cell frame having arrived at the wireless base station 60 in a given window. In an ATM setup, suitable frames are formed in each of different service categories such as CBR (Constant Bit Rate), rt-VBR (real time-Variable Bit Rate), nrt-VBR (non-real time-Variable Bit Rate), ABR (Available Bit Rate) and UBR (Unspecified Bit Rate). This scheme helps improve the quality of services.

More specifically, FIG. 7A shows an ATM cell frame in the service category of rt-VBR. In FIG. 7A, an rt-VBR frame 600 comprises a frame sequence 601; an input time/rate information 602; ATM cell header information 603 excluding HEC and VPI/VCI; FEC (Forward Error Correction) 604; a frame payload 606 linking ATM cell payloads A1 through A6, B1, B2, C1 and C2; and FEC 607 attached to a payload linkage. How powerful the FEC 604 and FEC 607 should be is determined by the quality required of the rt-VBR service.

As depicted in FIG. 7B, the frame payload 606 is constituted by a stored linkage of the payload portions of ATM cells 610 through 615 whose VPI/VCI is A; ATM cells 616 and 617 whose VPI/VCI is B; and ATM cells 618 and 619 whose VPI/VCI is C. In this example, the input time/rate information 602 about the wireless base station 60 regarding the ATM cells held in the frame payload 606 is attached collectively to the frame header, whereby the rt-VBR frame 600 is formed.

Figure 8A:
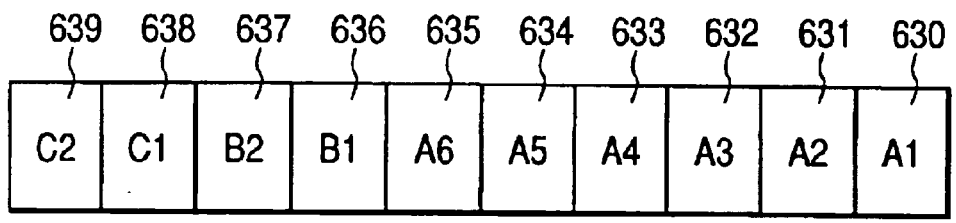
FIGS. 8A through 8D are schematic views showing methods for attaching ATM cell input time/rate information to cells.

FIGS. 8A through 8D are schematic views showing typical methods whereby ATM cell input time/rate information 602 in FIG. 7 is attached to ATM cells. FIG. 8A gives an example in which the input time information 602 is attached to all ATM cells held in the frame 600 of FIG. 7A. In this example, ATM cell input time information items 630 through 639 are attached to all of the ATM cells 610 through 615 whose VPI/VCI is A, of the ATM cells 616 and 617 whose VPI/VCI is B, and of the ATM cells 618 and 619 whose VPI/VCI is C, as illustrated.

Figure 8B:
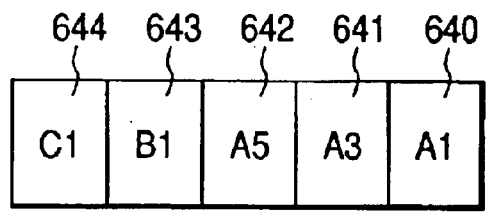

FIG. 8B shows an example in which the input time information 602 is thinned out before being attached to the ATM cells held in the frame 600 of FIG. 7A. In the example of FIG. 8B, the ATM cell input time information 602 is attached to every second cell of the ATM cells 610 through 615 whose VPI/VCI is A, to every second cell of the ATM cells 616 and 617 whose VPI/VCI is B, and to every second cell of the ATM cells 618 and 619 whose VPI/VCI is C.

Specifically, input time information items 640 through 642 are attached respectively to the ATM cells 610, 612 and 614 whose VPI/VCI is A; an input time information item 643 is attached to the ATM cell 616 whose VPI/VCI is B; and an input time information item 644 is attached to the ATM cell 618 whose VPI/VCI is C, as illustrated.

Although the example above is shown having the ATM cell input time information attached to every second cell, this is not limitative of the invention. In general, ATM cell input time information may be furnished at intervals of a plurality of cells.

Figure 8C:
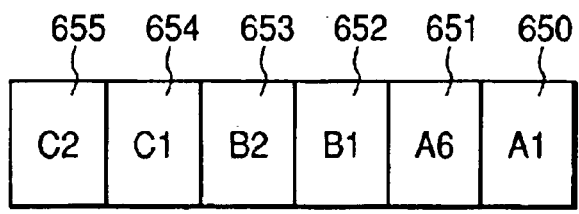

FIG. 8C gives another example in which the input time information 602 is thinned out before being attached to the ATM cells held in the frame 600 of FIG. 7A. In the example of FIG. 8C, the ATM cell input time information 602 is attached only to the first and the last cells of the series of ATM cells 610 through 615 whose VPI/VCI is A; to the first and the last cells of the series of ATM cells 616 and 617 whose VPI/VCI is B; and to the first and the last cells of the series of ATM cells 618 and 619 whose VPI/VCI is C.

Specifically, input time information items 650 and 651 are attached respectively to the ATM cells 610 and 615 whose VPI/VCI is A; input time information items 652 and 653 are attached to the ATM cells 616 and 617 whose VPI/VCI is B; and input time information items 654 and 655 are attached to the ATM cells 618 and 619 whose VPI/VCI is C, as depicted. These input time information items denote the times at which the respective cells were input to the wireless base station 60.

Figure 8D:
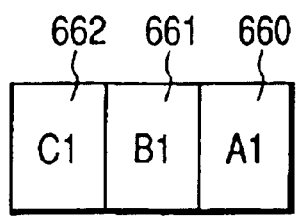

FIG. 8D shows yet another example in which the input time information 602 is thinned out before being attached to the ATM cells held in the frame 600 of FIG. 7A. In this example, the ATM cell input time information 602 is attached only to the first of the series of ATM cells 610 through 615 whose VPI/VCI is A; to the first of the series of ATM cells 616 and 617 whose VPI/VCI is B; and to the first of the series of ATM cells 618 and 619 whose VPI/VCI is C.

Specifically, an input time information item. 660 is attached to the ATM cell 610 whose VPI/VCI is A; an input time information item 661 is attached to the ATM cell 616w hose VPI/VCI is B; and an input time information item 662 is attached to the ATM cell 618 whose VPI/VCI is C, as shown. These input time information items denote the times at which the respective cells were input to the wireless base station 60.

Although the example of FIG. 8D is shown having the ATM cell input time information attached only to the first of each series of ATM cells having a specific VPI/VCI, this is not limitative of the invention. Alternatively, the ATM cell input time information may be attached to the last of each series of ATM cells with a specific VPI/VCI. As another alternative, the ATM cell input time information may be attached to any one of each series of ATM cells having a specific VPI/VCI.

Figure 9A:
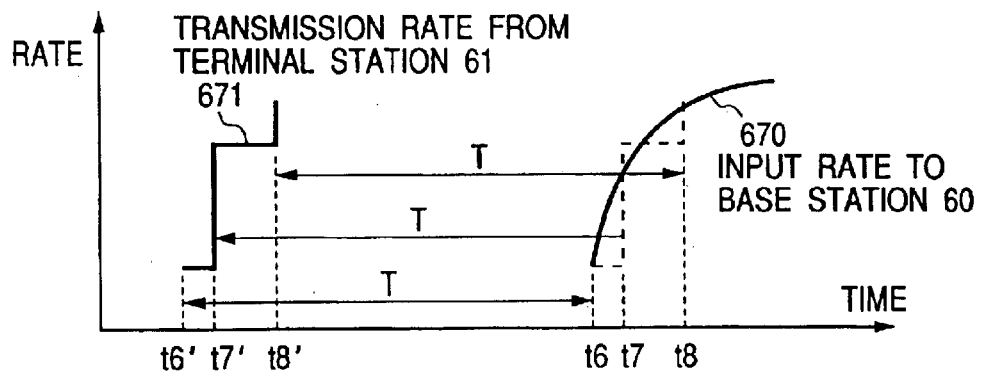
FIGS. 9A through 9C are schematic views of an example in which information about times of cell inputs to a wireless base station is thinned out before being attached to ATM cells.
Figure 9B:
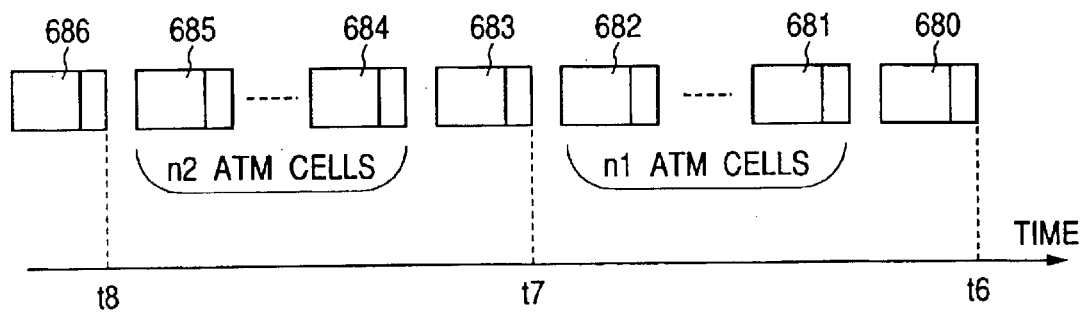
Figure 9C:
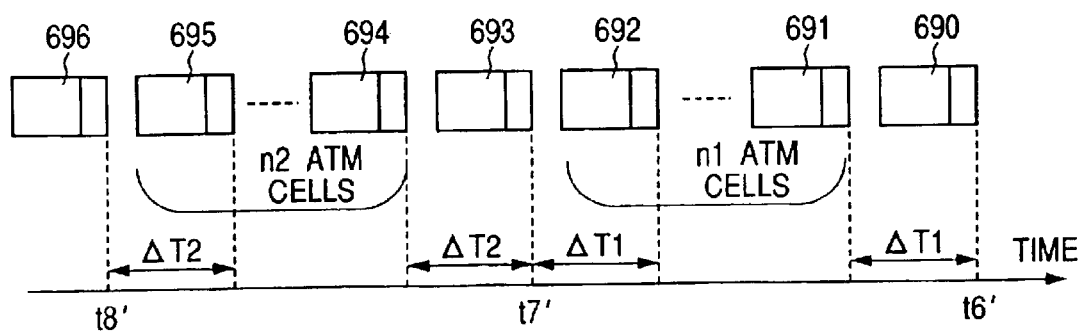

FIGS. 9A through 9C are schematic views of an example in which information about times of cell inputs to the wireless base station 60 is thinned out before being attached to the ATM cells in the frame 600 of FIG. 7A. FIG. 9A is a graphic representation showing changes over time in an input rate 670 of ATM cells input to the wireless base station 60 as well as in a transmission rate 671 of ATM cells transmitted from the wireless terminal station 61. FIG. 9B is a schematic view indicating times at which ATM cells are input to the wireless base station 60. FIG. 9C is a schematic view showing times at which ATM cells are transmitted from the wireless terminal station 61.

The wireless terminal station 61 transmits over a wired transmission path the ATM cells to which the input time information 602 about the cell inputs to the wireless base station 60 is attached, the transmission being performed in accordance with the information 602. The ATM cells without the input time information 602 regarding the wireless base station 60 are transmitted by the wireless terminal station 61 at predetermined constant time intervals over a wired network.

Suppose that, in the setup of FIG. 9B, an ATM cell 680 is input to the wireless base station 60 at a time t6 followed by as many as n1 ATM cells 618 through 682; that an ATM cell 683 is input to the station 60 at a time t7 followed by n2 ATM cells 684 through 685; and that an ATM cell 686 is input to the station 60 at a time t8. In that case, the wireless base station 60 attaches to a frame header the information made of the times t6, t7 and t8 about the cell inputs to the wireless base station 60. The input time information placed in the frame header is transmitted to the wireless terminal station 61 together with the sequence of the corresponding ATM cells.

As shown in FIG. 9C, the wireless terminal station 61 transmits, over a wired transmission path connected to the terminal equipment 51, ATM cells 690, 693 and 696 corresponding respectively to the ATM cells 680, 683 and 686 sent at times t6', t7' and t8'. The times t6', t7' and t8' are defined as t5'=t5+T t6'=t6+T t7'=t7+T where T denotes a constant time interval. The wireless terminal station 61 further transmits, over the wired transmission path connected to the terminal equipment 51, as many as n1 ATM cells 691 through 692 corresponding to the n1 ATM cells 681 through 682 at time intervals of $\Delta T1$ following the transmission of the ATM cell 690.

Likewise the wireless terminal station 61 transmits, over the wired transmission path connected to the terminal equipment 51, as many as n2 ATM cells 694 through 695 corresponding to the n2 ATM cells 684 through 685 at time intervals of $\Delta T2$ following the transmission of the ATM cell 693. The interval $\Delta T1$ is defined as a difference in time between t6 and t7, divided by (n1+1); the interval $\Delta T2$ is defined as a difference in time between t7 and t8, divided by (n2+1).

In the example of FIG. 9C, the input time information t6, t7 and t8 about the ATM cells 680, 683 and 686 input to the wireless base station 60 is attached to the frame header and transmitted to the wireless terminal station 61. Alternatively, the intervals $\Delta T1$ and $\Delta T2$ and the sequence of the ATM cells at the time when the time interval varies may be transmitted. It is also effective to transmit a rate value determined by the intervals $\Delta T1$ and $\Delta T2$ together with the sequence of the ATM cells at the time when the rate values varies.

Figure 10A:
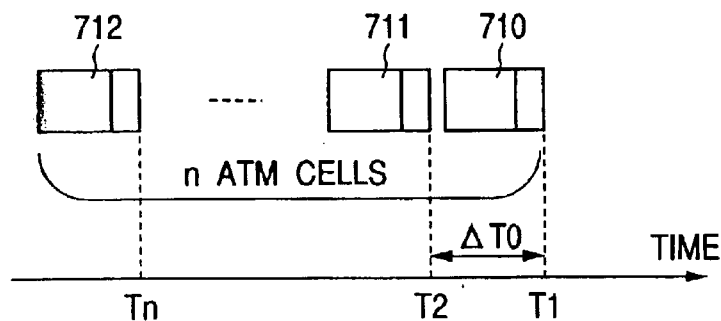
FIGS. 10A and 10B are schematic views of another example in which information about times of cell inputs to a wireless base station is thinned out before being attached to ATM cells.
Figure 10B:
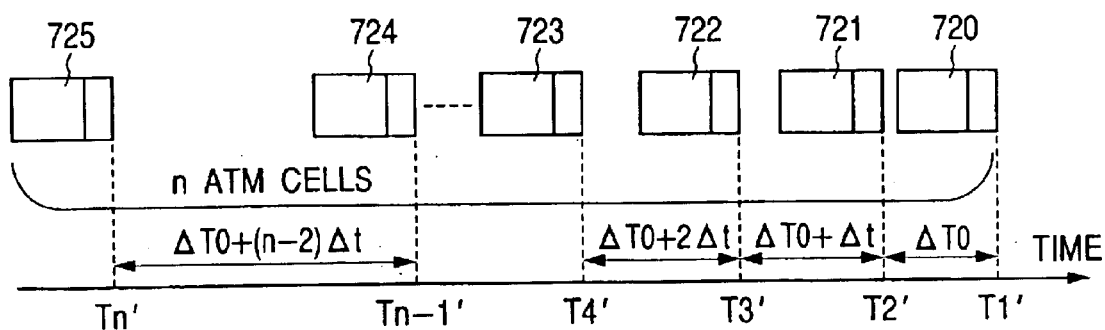

FIGS. 10A and 10B are schematic views of another example in which information about times of ATM cell inputs to the wireless base station 60 is thinned out before being attached to the ATM cells placed in the frame 600 of FIG. 7A. FIG. 10A shows times at which ATM cells are input to the wireless base station 60, and FIG. 10B indicates times at which ATM cells are output from the wireless terminal station 61.

The wireless terminal station 61 transmits over a wired transmission path the ATM cells to which the input time information 602 about the cell inputs to the wireless base station 60 is attached, the transmission being performed in accordance with the information 602. The ATM cells without the input time information 602 regarding the wireless base station 60 are transmitted over the wired transmission path by the wireless terminal station 61 according to relations obtained by linearly approximating time changes of the cell input time intervals based on the input time information 602. In this example, the approximation is made so that the time interval between the times of cell inputs to the wireless base station 60 increases over time.

Suppose that in FIG. 10A, as many as n ATM cells 710, 711, ..., 712 are input to the wireless base station 60 at times T1, T2, ..., Tn respectively, and that the interval between the times T1 and T2 is defined as $\Delta T0$. The wireless base station 60 attaches to a frame header the input time information T1–Tn about the ATM cells 710 through 712 input to the wireless base station 60, the frame header being transmitted to the wireless terminal station 61.

As shown in FIG. 10B, the wireless terminal station 61 transmits, over the wired transmission path connected to the terminal equipment 51, as many as n ATM cells 720, 721, 722, 723, ..., 724 and 725 corresponding to the n ATM cells 710 through 712 at times T1', T2', T3', ..., Tn-1' and Tn' respectively. The time T1' is defined as.

Ti'=Ti+T where T is a constant time interval. Other time intervals indicated in FIG. 10B are defined as $$TJ = T1' + (j-1)\Delta T0 + \left(\sum_{k=0}^{j-2} k\right)\Delta t \qquad \text{(Equation 1)}$$

where $$\Delta T0 = |T1 - T2| \ldots \qquad \text{(Equation 2)}$$

$$\Delta t = \frac{|T1 - T2| - (n-1)\Delta T0}{\sum_{k=0}^{n-2} k} \qquad \text{(Equation 3)}$$

and J=2, 3, ..., n.

Figure 11A:
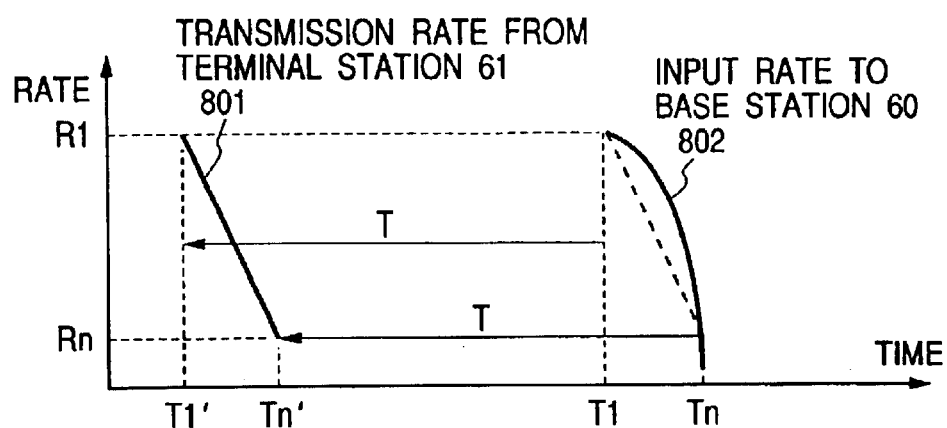
FIGS. 11A through 11C are schematic views of another example in which information about times of cell inputs to a wireless base station is thinned out before being attached to ATM cells.
Figure 11B:
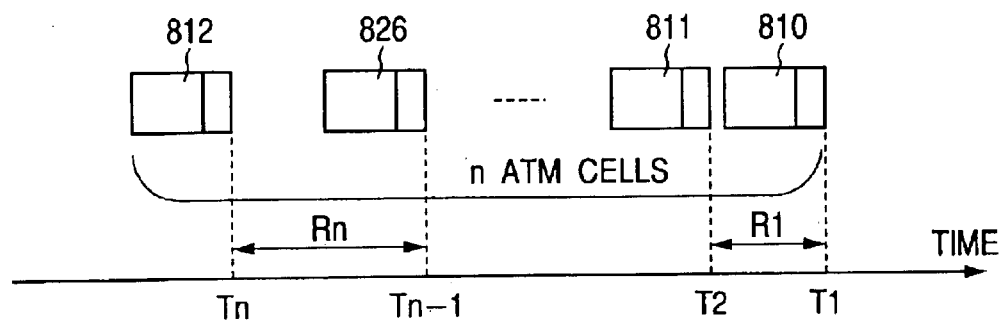
Figure 11C:
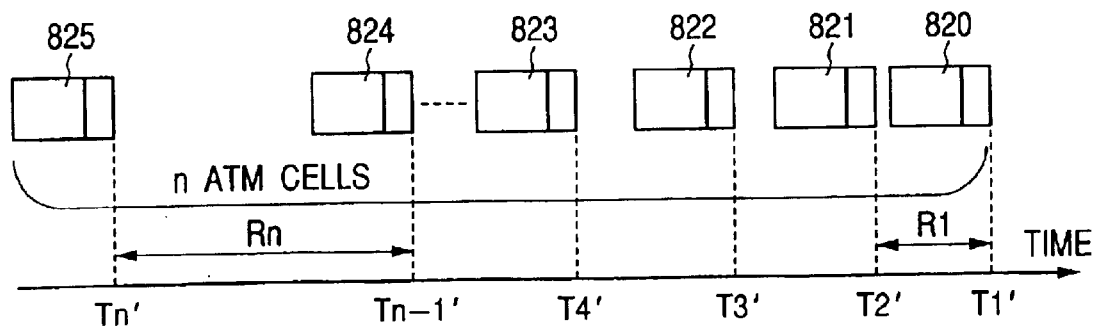

FIGS. 11A through 11C are schematic views of yet another example in which information about times of ATM cell inputs to the wireless base station 60 is thinned out before being attached to the ATM cells in the frame 600 of FIG. 7A. FIG. 11A is a graphic representation showing changes over time in an input rate of the ATM cells input to the wireless base station 60 as well as in a transmission rate of the ATM cells transmitted from the wireless terminal station 61. FIG. 11B shows times at which the ATM cells are input to the wireless base station 60, and FIG. 11B indicates times at which the ATM cells are output from the wireless terminal station 61.

The wireless terminal station 61 transmits over the wired transmission path the ATM cells to which the input time information 602 about the cell inputs to the wireless base station 60 is attached, the transmission being performed in accordance with the information 602. The ATM cells without the input time information 602 in connection with the wireless base station 60 are transmitted over the wired transmission path by the wireless terminal station 61 according to relations obtained by linearly approximating the cell input rate based on the input time information 602.

As shown in FIG. 11A, the input rate 802 of the ATM cells to the wireless base station 60 drops over time. The transmission rate of the ATM cells from the wireless terminal station 61 is obtained through linear approximation based on the input rate 802.

Suppose that as depicted in FIG. 11B, as many as n ATM cells 810, 811, . . . , 812 are input to the wireless base station 60 at times T1, T2, . . . , Tn respectively. The input rate of the ATM cell 810 is defined as R1 and the input rate of the ATM cell 812 as Rn. In that case, the wireless base station 60 attaches the time T1, ATM cell sequences and the rates R1 and Rn to a frame header that is transmitted to the wireless terminal station 61. The wireless terminal station 61, as shown in FIG. 11C, transmits at a time T1' an ATM cell 820 corresponding to the ATM cell 810 over the wired transmission path connected to the wireless terminal equipment 51. The time T1' is defined as Ti'=T1+T where T is a constant time interval. The transmission of the ATM cell 820 is followed by ATM cells 821, 822, 823, . . . , 824 and 825 transmitted between the times T1' and Tn' over the wired transmission path connected to the terminal equipment 51. The timings of the ATM cell transmission are varied linearly over time.

The preceding examples were shown having the frame 600 transmitted from the wireless base station 60 to the wireless terminal station 61. The same scheme may also be applied to a case in which the frame 600 is transmitted from the wireless terminal station 61 to the wireless base station 60 as well as to a case where one wireless terminal station transmits the frame 600 to another wireless terminal station.

In the above embodiment, the destination frame transmitter-receiver controls time delay variation of packet transmission in accordance with information representing either input times or input rates of packets input to the source frame transmitter-receiver. This makes it possible to attach to each packet its time-related information and to change packet output rates on the frame-receiving side in a flexible and simplified manner.

The packets (ATM cells) to which information about times of the packets input to the source frame transmitter-receiver is attached are transmitted by the destination frame transmitter-receiver over the transmission path in accordance with the input time information about the packet inputs to the source frame transmitter-receiver. The packets without information about times of the packets input to the source frame transmitter-receiver are transmitted over the transmission path by the destination frame transmitter-receiver in a timed manner denoting relations obtained by linearly approximating time changes of packet input time intervals. This also makes it possible to attach to each packet its time-related information and to change packet transmission time intervals on the frame-receiving side in a flexible and simplified fashion. As a result, time delay variation of packet transmission is controlled with high precision regardless of the packet input time intervals being increased or decreased.

Furthermore, the packets (ATM cells) to which information about times of the packets input to the source frame transmitter-receiver is attached are transmitted by the destination frame transmitter-receiver over the transmission path in accordance with the input time information about the packet inputs to the source frame transmitter-receiver. The packets without information about times of the packets input to the source frame transmitter-receiver are transmitted over the transmission path by the destination frame transmitter-receiver in a timed manner denoting relations obtained by linearly approximating the packet input rates. This makes it possible to attach to each packet its time-related information and to change packet transmission rates on the frame-receiving side in a flexible and simplified fashion. As a result, time delay variation of packet transmission is controlled with high accuracy whether the packet input rate is increased or decreased.

In the manner described, the invention provides a packet communication system and a packet communication apparatus whereby time delay variation in packet transmission sections is minimized.

While the present invention has been described above in conjunction with the preferred embodiments, one of ordinary skill in the art would be enabled by this disclosure to make various modifications to these embodiments and still be within the scope and spirit of the invention as defined in the appended claims.

What is claimed is:

1. A packet communication system comprising:
   a first communication apparatus for transmitting a communication frame having a payload field for carrying a group of packets to be transferred under time delay variation control and a time information field for indicating input time for at least a representative packet of said group of packets; and
   a second communication apparatus for receiving the communication frame from said first communication apparatus and transferring the packets extracted from the received communication frame over a transmission path in such a manner that each packet having indication of an input time in said time information field is sent out at a timing decided in accordance with said input time of said each packet and other packets each having no indication of an input time in said time information field are sent out at predetermined time intervals starting from a time of transfer of a preceding packet having an indication of an input time in said time information field,
   wherein said predetermined time intervals are constant time intervals, and
   wherein said group of packets are transferred from said second communication apparatus in an order of their input with their time delay variation controlled.

2. A packet communication system according to claim 1, wherein said predetermined time intervals are obtained by linearly approximating time changes of packet input time intervals.

3. A packet communication system according to claim 1, wherein said predetermined time intervals are obtained by linearly approximating a packet input rate.

4. A packet communication system comprising:
   a first communication apparatus for transmitting a group of packets through a payload field defined in a communication frame, said group of packets to be transferred under time delay control, and at least a time information item for indicating input time for at least a representative packet of said group of packets through a time information field defined in the communication frame; and a second communication apparatus for receiving the communication frame and transferring the packets extracted from the payload field to a communication path in such a manner that each packet having a time information item in said time information field is sent out at a timing decided in accordance with time information item extracted from said time information field and other packets each having no time information item in said time information field is sent out at predetermined time intervals starting from a time of transfer of a preceding packet having an indication of an input time in said time information field, and wherein said group of packets are transferred from said second communication apparatus in an order of their input with their time delay variation controlled.

5. A packet communication system according to claim 4, wherein said first communication apparatus and said second communication apparatus communicate using said communication frame through a wireless channel.

6. A packet communication system according to claim 4, wherein said packets to be transmitted from said first communication apparatus to said second communication apparatus are fixed length packets.

7. A packet communication system according to claim 4, wherein said time information indicates receiving time of said at least one of said packets at said first communication apparatus.

8. A packet communication system according to claim 4, wherein said payload field is preceded by said time information field in said communication frame.

9. A packet transferring method in a communication system including a first communication apparatus and a second communication apparatus, the method comprising the steps of:

receiving a group of packets from a first transmission line by said first communication apparatus, said group of packets to be transferred under time delay control;

communicating between said first communication apparatus and said second communication apparatus the group of packets through a payload field defined in a communication frame and at least a time information item of at least a representative packet of said group of said packets through a time information field defined in the communication frame; and transferring the packets from said second communication apparatus to a second transmission line in such a manner that each packet having a time information item in said time information field is sent out at a timing decided in accordance with said time information item and other packets each having no time information item in said time information field are sent out at predetermined time intervals starting from a time of transfer of a preceding packet having a time information item in said time information field, and wherein said group of packets are transferred from said second communication apparatus in an order of their input with their time delay variation controlled.

10. A packet transferring method according to claim 9, wherein said first communication apparatus transmits said at least two of said packets and said time information item with wireless signals.

11. A packet transferring method according to claim 9, wherein said first communication apparatus transmits said at least two of said packets as fixed length packets.

12. A packet transferring method according to claim 9, wherein said time information item indicates receiving time of said at least two of packets at said first communication apparatus.

13. A packet transferring method in a communication system including a first communication apparatus and a second communication apparatus, the method comprising the steps of:

receiving a group of cells from a first transmission line by said first communication apparatus, said group of cells to be transferred under time delay control;

transmitting from said first communication apparatus to said second communication apparatus, a communication frame having a payload field for carrying said plurality of cells and a time information field for carrying a time information item of at least a representative cell of said group of cells indicating an input time of said representative cell, receiving the communication frame by said second communication apparatus; and transmitting from said second communication apparatus to a second transmission line each of said cells having a time information item in said time information field at a timing decided in accordance with said time information item and other cells each having no time information item in said time information field at predetermined time intervals starting from a time of transmission of a preceding packet having an indication of an input time in said time information field, and wherein said group of packets are transferred from said second communication apparatus in an order of their input with their time delay variation controlled.

14. A packet transferring method according to claim 13, wherein said predetermined time intervals are constant time intervals.

15. A packet transferring method according to claim 13, wherein said predetermined time intervals are obtained by linearly approximating time change of packet input time intervals.

16. A packet transferring method according to claim 13, wherein said predetermined time intervals are obtained by linearly approximating a packet input rate.

* * * * *